(12) United States Patent
Thumpudi et al.

(10) Patent No.: US 11,893,791 B2
(45) Date of Patent: Feb. 6, 2024

(54) PRE-PROCESSING IMAGE FRAMES BASED ON CAMERA STATISTICS

(71) Applicant: Microsoft Technology Licensing, LLC, Redmond, WA (US)

(72) Inventors: Naveen Thumpudi, Redmond, WA (US); Louis-Philippe Bourret, Redmond, WA (US); Christian Palmer Larson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 696 days.

(21) Appl. No.: 16/298,841

(22) Filed: Mar. 11, 2019

(65) Prior Publication Data

US 2020/0293782 A1    Sep. 17, 2020

(51) Int. Cl.
*G06V 20/40* (2022.01)
*G06N 20/00* (2019.01)
*H04N 23/62* (2023.01)

(52) U.S. Cl.
CPC .......... *G06V 20/40* (2022.01); *G06N 20/00* (2019.01); *G06V 20/41* (2022.01); *G06V 20/46* (2022.01); *H04N 23/62* (2023.01)

(58) Field of Classification Search
None
See application file for complete search history.

(56) References Cited

U.S. PATENT DOCUMENTS

| 6,985,172 | B1 * | 1/2006 | Rigney | G08B 13/19691 |
| | | | | 348/169 |
| 8,837,576 | B2 * | 9/2014 | Liang | H04N 19/107 |
| | | | | 375/240 |
| 10,691,925 | B2 * | 6/2020 | Ng | G06N 5/046 |
| 10,706,701 | B2 * | 7/2020 | Beiser | G08B 13/19693 |
| 2002/0024999 | A1 | 2/2002 | Yamaguchi et al. | |

(Continued)

OTHER PUBLICATIONS

Htike, Zaw Zaw, Simon Egerton, and Kuang Ye Chow. "A monocular view-invariant fall detection system for the elderly in assisted home environments." 2011 Seventh International Conference on Intelligent Environments. IEEE, 2011. (Year: 2011).*

(Continued)

*Primary Examiner* — Andrae S Allison
(74) *Attorney, Agent, or Firm* — Ray Quinney & Nebeker; James Bullough

(57) ABSTRACT

The present disclosure relates to systems, methods, and computer-readable media for selectively identifying image frames from an input video to provide to an image processing model based on camera statistics. For example, systems disclosed herein include receiving an input video and associated camera statistics from a video capturing device. The systems disclosed herein further include identifying select image frames to provide to the image processing model based on the camera statistics and based on an application of the image processing model. The systems disclosed herein further include selectively identifying and providing camera statistics to the image processing model. By selectively providing data to the image processing model based on camera statistics, the systems disclosed herein can leverage capabilities of video capturing devices to significantly reduce the expense of processing resources when utilizing a variety of image processing models.

20 Claims, 9 Drawing Sheets

(56) References Cited

U.S. PATENT DOCUMENTS

| | | | |
|---|---|---|---|
| 2002/0036717 A1 | 3/2002 | Abiko et al. | |
| 2006/0136575 A1* | 6/2006 | Payne | G08B 13/19656 348/E7.086 |
| 2007/0147504 A1 | 6/2007 | Wang et al. | |
| 2008/0043848 A1 | 2/2008 | Kuhn | |
| 2010/0118114 A1* | 5/2010 | Hosseini | H04N 19/115 375/E7.076 |
| 2017/0336858 A1* | 11/2017 | Lee | H04N 5/23245 |
| 2017/0337425 A1 | 11/2017 | Lee et al. | |
| 2018/0041765 A1* | 2/2018 | Hua | H04N 21/44008 |
| 2018/0295367 A1 | 10/2018 | Mohammed et al. | |
| 2018/0341811 A1 | 11/2018 | Bendale et al. | |
| 2019/0005361 A1* | 1/2019 | Cho | G06V 10/82 |
| 2019/0005653 A1* | 1/2019 | Choi | G06V 20/52 |
| 2019/0044703 A1 | 2/2019 | Smith | |
| 2019/0147279 A1* | 5/2019 | Liu | G06V 20/46 382/181 |
| 2019/0156124 A1* | 5/2019 | Singhal | G06V 20/41 |
| 2019/0213474 A1* | 7/2019 | Lin | G06V 40/16 |
| 2019/0221090 A1* | 7/2019 | Beiser | G08B 13/19693 |
| 2020/0097769 A1 | 3/2020 | Lipchin et al. | |
| 2020/0106930 A1* | 4/2020 | Hohjoh | H04N 5/145 |
| 2020/0193609 A1 | 6/2020 | Dharur et al. | |
| 2020/0294246 A1 | 9/2020 | Larson et al. | |
| 2023/0086804 A1 | 3/2023 | Larson et al. | |

OTHER PUBLICATIONS

J. Kim, Y. J. Mo, W. Lee and D. Nyang, "Dynamic Security-Level Maximization for Stabilized Parallel Deep Learning Architectures in Surveillance Applications," 2017 IEEE Symposium on Privacy-Aware Computing (PAC), 2017, pp. 192-193, doi: 10.1109/PAC. 2017.22. (Year: 2017).*

"Non Final Office Action Issued in U.S. Appl. No. 16/352,714", dated Sep. 20, 2021, 15 Pages.

Ngo, et al., "Chapter 14: Digital Media Archival", In Book Multimedia Image and Video Processing, Second Edition, Mar. 2, 2012, 30 Pages.

"International Search Report and Written Opinion Issued in PCT Application No. PCT/US20/020574", dated Aug. 17, 2020, 17 Pages.

"International Search Report and Written Opinion Issued in PCT Application No. PCT/US20/020575", dated Jul. 3, 2020, 19 Pages.

Zhang, et al., "FAST: A Framework to Accelerate Super-Resolution Processing on Compressed Videos", In Proceedings of the IEEE Conference on Computer Vision and Pattern Recognition Workshops, Jul. 21, 2017, pp. 1015-1024.

"Notice of Allowance Issued in U.S. Appl. No. 16/352,714", dated Jul. 28, 2022, 11 Pages.

"Final Office Action Issued in U.S. Appl. No. 16/352,714", dated Apr. 12, 2022, 19 Pages.

Sah, et al., "Semantic Text Summarization of Long Videos", In Proceedings of IEEE Winter Conference on Applications of Computer Vision (WACV), Mar. 24, 2017, pp. 989-997.

Rajat, "TensorCam: World's First AI Camera by Deep Cognition", Retrieved from :<<https://towardsdatascience.com/tensorcam-worlds-first-ai-camera-by-deep cognition-10f07ae694fd>>, Oct. 28, 2018, 12 Pages.

"Ultra Fast On-Device Computer Vision Library for Mobile & Embedded", Retrieved from :<<http://www.uncannyvision.com/uncannycv/>>, Retrieved on: Feb. 5, 2019, 2 Pages.

"Uncanny Surveillance using Artificial Intelligence", Retrieved from :<<https://web.archive.org/web/20171008151303/http:/www.uncannyvision.com/uncannysurveillance/>>, Retrieved on: Oct. 8, 2017, 2 Pages.

Torralba, et al., "Statistics of Natural Image Categories", In Journal of Network: Computation in Neural Systems, vol. 14, Issue 3, May 12, 2003, pp. 391-412.

"Office Action Issued in Indian Patent Application No. 202147037878", dated Jul. 7, 2023, 8 Pages.

"Office Action Issued in European Patent Application No. 20715241. 4", dated Sep. 7, 2023, 7 Pages.

Escobedo-Cardenas, et al., "A Robust Gesture Recognition Using Hand Local Data and Skeleton Trajectory", In Proceedings of International Conference on Image Processing, Sep. 27, 2015, pp. 1240-1244.

* cited by examiner

PRE-PROCESSING IMAGE FRAMES BASED ON CAMERA STATISTICS

CROSS-REFERENCE TO RELATED APPLICATIONS

N/A

BACKGROUND

Recent years have seen a precipitous rise in the use of computing devices (e.g., mobile devices, personal computers, server devices) to capture, store, and edit digital media. Indeed, it is now common for electronic devices to capture digital media and process the digital media in various ways. For example, conventional media systems often include various applications or tools for processing digital media. These media processing applications provide a wide range of utility in processing images and videos.

Nevertheless, while media processing applications provide useful tools for analyzing digital media and generating useful outputs, these applications and tools include a variety of problems and drawbacks. For example, many media processing applications are inefficient and/or consume significant processing resources to operate effectively. Indeed, with video capturing devices capturing and storing higher quality images than ever before, conventional applications require significant computing resources and processing time to execute applications successfully. To illustrate, media processing applications that utilize machine learning techniques can exhaust processing power of client computing devices as well as result in significant cloud computing expenses. Moreover, conventional media processing applications can take a significant amount of time to produce desired results.

These and other problems exist with regard to using various applications and software tools for analyzing and processing digital media.

DETAILED DESCRIPTION

Figure 1:
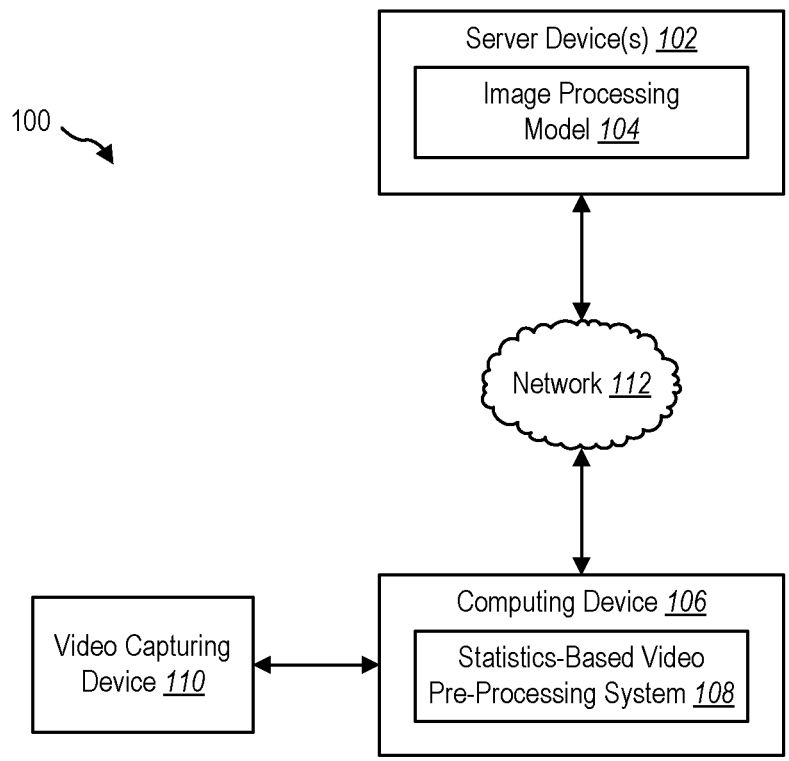
FIG. 1 illustrates an example environment including a statistics-based video pre-processing system in accordance with one or more implementations.

The present disclosure relates to a statistics-based video pre-processing system (or simply a "pre-processing system") implemented in connection with an image processing model. In particular, as will be discussed in further detail below, a pre-processing system may receive an input video from one or more video capturing devices. The pre-processing system can additionally identify camera statistics for content of the input video (or simply "input video content") to determine one or more operations to perform on the input video content prior to providing one or more image frames to the image processing model, which may include a deep learning model.

To illustrate, the pre-processing system can analyze the input video content received from a camera device in view of camera statistics also received from the camera device. In particular, the pre-processing system can use camera statistics such as a measurement of camera focus, white balance, lighting conditions, detected objects, or other statistics obtained by the video capturing device to identify a subset of image frames from the input video to feed to the image processing model. For example, the pre-processing system can selectively identify a subset of image frames based on camera statistics to yield a more accurate or useful output as well as utilize fewer processing resources when applying the image processing model to the subset of images.

In addition to identifying and providing images from the input video to the image processing model, the pre-processing system can additionally provide camera statistics obtained by a video capturing device to the image processing model. Where the image processing model is trained based on images and associated camera statistics, the image processing model may more accurately and/or efficiently generate a useful output based on a particular application or function of the image processing model. In addition to enabling the image processing model to accurately and efficiently generate useful outputs, pre-processing the input video in accordance with one or more implementations described herein enables various types of image processing models to process data and generate useful outputs while utilizing fewer resources than conventional media processing systems.

The present disclosure includes a number of practical applications that provide benefits and/or solve problems associated with analyzing and processing images. For example, as mentioned above, by intelligently selecting a subset of image frames from input video content, the pre-processing system enables an image processing model to more efficiently generate an output based on a particular application or function of an image processing model while using fewer processing resources. Moreover, by pre-processing input video content in various ways, the pre-processing system similarly enhances utility of the image processing system while reducing consumption of processing resources.

In addition, by identifying image frames and pre-processing video content based on camera statistics, the pre-processing system can leverage information readily available using built-in capabilities of video capturing devices. In particular, where the video capturing device is already using camera statistics to refine video footage and generate an input video, the pre-processing system can leverage these statistics to strategically feed image data to the image processing model in a more efficient way. In addition, the pre-processing system can cause the camera statistics obtained from the video capturing device to be provided as an input to the image processing model to enhance functionality and accuracy of the image processing model for a number of different applications.

As illustrated in the foregoing discussion, the present disclosure utilizes a variety of terms to describe features and advantages of a pre-processing system. Additional detail will now be provided regarding the meaning of such terms. For example, as used herein, a "video capturing device" refers to an electronic device capable of capturing video footage and generating input video content. A video capturing device may refer to a standalone device in communication with a computing device. A video capturing device may alternatively refer to a camera or other video capturing device integrated within the computing device. In one or more implementations, the video capturing device captures video footage (e.g., unrefined or raw video content) and utilizes any number of camera statistics to refine the video footage to generate an input video including a plurality of image frames (e.g., a plurality of images representative of the video), which may include a refined video in accordance with the camera statistics.

As used herein "camera statistics" refer to a variety of metrics and measurements associated with capturing video footage and generating input video content. Camera statistics may refer to any feature or measurement obtained or generated by the video capturing device and/or an application running on the video capturing device. For example, camera statistics may refer to specifications and features of the camera capturing device such as resolution of images captured by the video capturing device, detected movement of the device, and/or a configuration (e.g., zoom, orientation) of one or more lenses used in conjunction with capturing the video footage. In addition to device-related features, camera statistics may refer to heuristic data associated with operations performed by one or more applications running on the video capturing device for transforming, refining, or otherwise modifying the image. For example, camera statistics may refer to a focus measurement, a white balance measurement, lighting conditions, scene detection statistics, detection of objects, or other metrics that one or more applications on the video capturing device are capable of identifying and providing to the pre-processing system. Moreover, in one or more embodiments, camera statistics can include features or characteristics of the video content. For example, camera statistics may include content characteristics such as resolution of individual image frames that make up the video content, a frame rate (e.g., a number of frames per second) of the video content, and/or a display ratio of the image frames.

As discussed above, the pre-processing system can provide video frames (e.g., a subset of video frames, transformed video frames) to an image processing model. As used herein, an "image processing model" refers to any model trained to generate an output based on one or more input image frames. The image processing model may refer to one or more of a computer algorithm, a classification model, a regression model, an image transformation model, or any type of model having a corresponding application or defined functionality. The image processing model may additionally refer to a deep learning model, such as a neural network (e.g., convolutional neural network, recurrent neutral network) or other machine learning architecture trained to perform a variety of applications based on input images. In one or more implementations, the image processing model is trained to generate an output based on both input images and associated camera statistics.

As used herein, an "output" of the image processing model may refer to any type of output based on a type of image processing model or application implemented by the image processing model. For example, where the image processing model refers to a classification model, an output of the image processing model may include a classification of one or more images such as whether a face is detected, an identification of an individual associated with the face, an identification of an object within the image(s), a rating for the image or video, or any other classification of one or more image frames. As another example, where the image processing model includes a quick read (QR) code or barcode reading application, an output may refer to an output image including a clear representation of the QR code, barcode, and/or a decoded value extracted from the image(s) of the displayed code. As a further example, where the image processing model includes an optical character recognition (OCR) application, an output may include text data, character data, or other data generated based on analyzing content of the images provided to the image processing model. Indeed, it will be understood that the output may refer to any desired output corresponding to a number of applications and processing models that are generated based on one or multiple input parameters (e.g., images, camera statistics).

Additional detail will now be provided regarding a pre-processing system in relation to illustrative figures portraying example implementations. For example, FIG. 1 illustrates an example environment 100 for pre-processing input video to identify and provide image frames to an image processing model. As shown in FIG. 1, the environment 100 includes one or more server device(s) 102 including the image processing model 104. In addition, the environment 100 includes a computing device 106 including a statistics-based video pre-processing system 108 (or simply "pre-processing system 108"). The environment 100 also includes a video capturing device 110.

As shown in FIG. 1, the server device(s) 102 and computing device 106 can communicate with each other directly or indirectly through a network 112. The network 112 may include one or multiple networks and may use one or more communication platforms or technologies suitable for transmitting data. The network 112 may refer to any data link that enables the transport of electronic data between devices and/or modules of the environment 100. The network 112 may refer to a hardwired network, a wireless network, or a combination of a hardwired and a wireless network. In one or more embodiments, the network 112 includes the Internet.

The computing device 106 may refer to various types of computing devices. For example, the computing device 106 may include a mobile device such as a mobile telephone, a smartphone, a personal digital assistant (PDA), a tablet, or a laptop. Additionally, or alternatively, the computing device 106 may include a non-mobile device such as a desktop computer, server device, or other non-portable device. The server device(s) 102 may similarly refer to various types of computing device. Each of the computing device 106 and the server device(s) 102 may include features and functionality described below in connection with FIG. 8.

Moreover, the video capturing device 110 can refer to any type of camera or other electronic device capable of capturing video footage and providing a generated input video and associated camera statistics to the pre-processing system 108. In one or more embodiments, the video capturing device 110 is a stand-alone digital camera or other video capturing device including video capturing capabilities. Alternatively, in one or more embodiments, the video capturing device 110 is integrated within the computing device 106.

As will be discussed in further detail below, the video capturing device 110 may capture video footage and apply a number of camera statistics to the video footage to generate an input video having a plurality of image frames. For example, while capturing video footage, the video capturing device 110 may focus the image, adjust the white balance, and apply one or more settings to compensate for lighting or other ambient conditions. In addition, the video capturing device 110 may analyze the captured content using various tools to detect scenes, detect objects, or otherwise identify specific types of content within the video footage. Moreover, the video capturing device 110 may perform one or more operations on the captured content including, by way of example, fusing multiple video frames together or enhancing one or more captured frames of video content.

The video capturing device 110 may provide the input video content to the computing device 106 for pre-processing based on the camera statistics. For example, after refining the captured video footage using the various camera statistics, the video capturing device 110 can provide the video content to the computing device 106 for further processing. In one or more embodiments, the video capturing device 110 provides a video stream (e.g., a live video stream) as the video footage is captured and refined by the video capturing device 110. Alternatively, the video capturing device 110 may provide a video file to the computing device 106.

In addition to providing input video content to the computing device 106, the video capturing device 110 can provide any number of camera statistics to the computing device 106. For example, the video capturing device 110 may provide a set of all camera statistics obtained when capturing and generating the input video content. The camera statistics may include a file of camera statistics for the corresponding video content. Alternatively, the video capturing device 110 may provide camera statistics as part of a digital video file (e.g., as metadata of the video file). In one or more embodiments, the video capturing device 110 provides the camera statistics in connection with respective frames of the input video content as the video capturing device 110 provides the input video to the computing device 106.

As mentioned above, and as will be discussed in further detail by way of example below, the camera statistics may include any number of different statistics depending on characteristics of the input video as well as features and capabilities of the video capturing device 110. For instance, the video capturing device 110 may obtain and provide camera statistics including an indication of image frames where an image is in focus (or a focus metric with respect to various image frames), an indication of a white balance with respect to one or more multiple image frames, a metric of lighting conditions detected by the video capturing device 110, an identification of which image frames correspond to scene changes, a resolution of image frames that make up the video content, a frame rate of the video content (e.g., a number of frames per second of the input video content), an identification of objects and associated frames where one or more objects appear, and information about merging of multiple image frames together when generating the input video.

In one or more embodiments, the pre-processing system 108 identifies one or more camera statistics to use in identifying image frames to provide to the image processing model 104. For example, the pre-processing system 108 may identify a portion or subset of camera statistics from a collection of all camera statistics provided by the video capturing device 110. The pre-processing system 108 may identify the relevant camera statistics based on an application of the image processing model 104. As another example, the pre-processing system 108 may identify camera statistics based on which image frames are provided to the image processing model 104 (discussed below).

As will be discussed in further detail below, the pre-processing system 108 can identify image frames and camera statistics to provide to the image processing model 104. For example, the pre-processing system 108 can identify a subset of image frames from a plurality of image frames representative of all frames of the input video to provide as input to the image processing model 104. As another example, the pre-processing system 108 can perform additional processing on the input video to generate one or more transformed or otherwise modified image frames to provide as input to the image processing model 104. As a further example, the pre-processing system 108 can identify any of the camera statistics to provide to the image processing model 104 in conjunction with providing corresponding image frames to the image processing model 104.

Upon receiving the model input data (e.g., image frames, camera statistics), the image processing model 104 can apply one or more applications and/or algorithms of the image processing model 104 to the input image frames (and/or camera statistics) to generate an output. For example, the image processing model 104 can generate one or more classifications, output images, decoded data, extracted text, or other output based on a training of the image processing model 104 to generate a desired output.

While FIG. 1 illustrates an example environment 100 including a particular number and arrangement of server device(s) 102, a computing device 106, and a video capturing device 110, it will be understood that the environment 100 may include any number of devices, including the image processing model 104 and pre-processing system 108 implemented on the same network of devices and/or across multiple devices, as shown in FIG. 1. For example, in one or more embodiments, the image processing model 104 is implemented on a cloud computing system including the server device(s) 102. Alternatively, the image processing model 104 may be implemented on an edge device and/or the same device as the pre-processing system 108 and/or the video capturing device 110 with communication between modules or internal components of a single computing device.

Figure 2A:
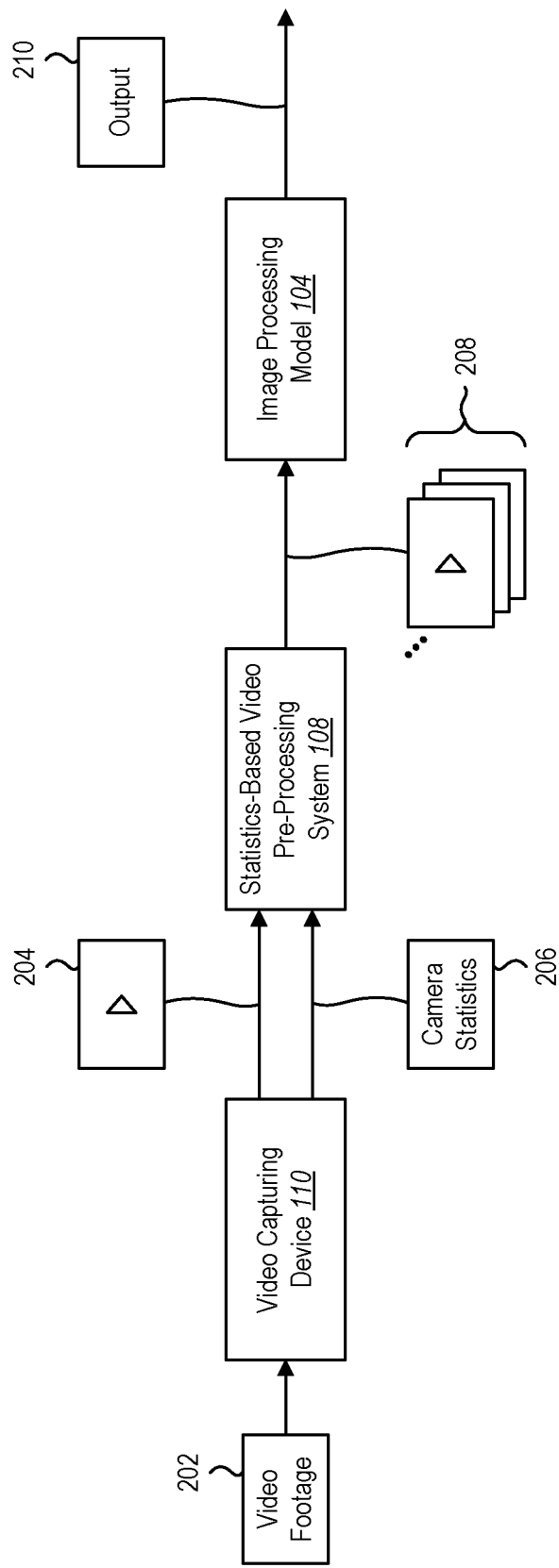
FIG. 2A illustrates an example process for identifying and providing image frames to an image processing model in accordance with one or more implementations.

Moving on to FIG. 2A, FIG. 2A illustrates an example framework for selectively identifying image frames to provide to an image processing model 104 in accordance with one or more embodiments. For example, as shown in FIG. 2A, the video capturing device 110 can capture video footage 202. The video footage 202 may include captured visual data in the visible spectrum such as red green blue (RGB) data or the invisible spectrum such as infrared data. The video footage 202 may additionally include depth data. The video capturing device 110 can capture footage and generate video content having a particular frame rate and resolution based on specifications and capabilities of the video capturing device 110. In addition, the video capturing device 110 can capture footage and generate video content having a particular display ratio based on specifications and capabilities of the video capturing device. The video capturing device 110 can generate an input video 204 based on the input video footage 202. In particular, the video capturing device 110 can generate an input video 204 by transforming, refining, or otherwise modifying the incoming video footage 202. In processing the video footage to generate the input video 204, the video capturing device 110 can track or otherwise collect a number of camera statistics such as specifications and features of the video capturing device 110, heuristic data about the transformation or other modifications that were made to the video footage 202 in generating the input video 204, and an identification of content (e.g., detected objects, scene changes) within the image frames that make up the input video 204. In addition, the video capturing device 110 can identify camera statistics such as depth data, a type of lens (e.g., a fish-eye lens), or various simple scalars (e.g., exposure, ISO measures, focus quality at the center). The video capturing device 110 can further identify metrics such as vectors (e.g., saturation of primaries, focus measurement in multiple regions of a viewport). The video capturing device 110 can further identify a spatial map (e.g., a quality of depth).

As shown in FIG. 2A, the video capturing device 110 can provide both the input video 204 and associated camera statistics 206 to the pre-processing system 108. The pre-processing system 108 may perform a number of actions associated with the input video 204 and camera statistics 206. For example, the pre-processing system 108 may identify a subset of the camera statistics 206 that are relevant to a particular application of the image processing model 104. For instance, where the image processing model includes a deep learning model trained to identify or classify various types of objects shown within digital images, the pre-processing system 108 may selectively identify camera statistics associated with image clarity (e.g., a focus statistic) and an identification of frames that include one or more detected objects to further analyze or process image frames of the input video 204.

The pre-processing system 108 may utilize the identified statistics provided from the video capturing device 110 to identify a subset of image frames 208 from a plurality of image frames of the input video 204. In particular, using the camera statistics, the pre-processing system 108 can selectively identify a subset of image frames 208 including images that, based on the associated camera statistics, include focused images and/or that include detected objects that would provide more useful data to the image processing model 104 in classifying the image frames and/or content shown therein.

The pre-processing system 108 can select any number of image frames to provide to the image processing model 104. In one or more embodiments, the pre-processing system 108 identifies a number of image frames based on a capability of a computing device (e.g., the server device(s) 102) to apply the image processing model 104 at a particular frame rate. For example, where the image processing model 104 is capable of analyzing two image frames per second, the pre-processing system 108 may provide fewer image frames to the image processing model 104 than where the server device(s) 102 is capable of applying the image processing model 104 to ten image frames per second.

As another example, the pre-processing system 108 can identify a number of image frames or rate of image frames based on a complexity and application of the image processing model 104. For instance, the pre-processing system 108 may provide a greater number or rate of image frames for analysis to a less complex image processing model 104 (e.g., a simple algorithm) than where the image processing model 104 is more complex (e.g., a complex neural network or deep learning model). In one or more embodiments, the pre-processing system 108 determines a rate or number of image frames to provide to the image processing model 104 based on processing capabilities of a computing device including the image processing model 104 and based on a complexity of the image processing model 104 and/or application of the image processing model 104.

In identifying the subset of image frames 208 to provide to the image processing model 104, the pre-processing system 108 can identify the video frames at a corresponding frame rate for different portions or durations of the input video 204 based on camera statistics corresponding to the respective portions of the input video. For example, where a first portion of the input video 204 is associated with camera statistics 206 that indicate that image frames from the first portion are out of focus or include no objects or movement detected therein, the pre-processing system 108 can identify one or more video frames from the first portion at a low frame rate. Indeed, because content of blurry images and/or images including redundant content would likely provide less useful or redundant data for analysis using the image processing model 104, the pre-processing system 108 can provide fewer image frames (e.g., one frame for every five seconds of the input video 204) as inputs to the image processing model 104 to avoid wasting processing resources of a computing device implementing the image processing model 104.

As a further example, where a second portion of the input video 204 is associated with camera statistics 206 that indicate that the image frames from the second portion are in focus and/or include detected objects or movement therein, the pre-processing system 108 can identify image frames from the second portion at a higher frame rate than the first portion (where the images are out of focus and/or include no detected objects). Because content of the focused images and/or images including objects detected therein would likely provide more useful results and/or non-redundant data for analysis using the image processing model 104, the pre-processing system 108 can provide a higher number or rate of image frames (e.g., 2-10 frames for every second of input video 204) as inputs to the image processing model 104 as those frames are more likely to include useful data than image frames from other portions of the input video 204.

As shown in FIG. 2A, the image processing model 104 can generate an output 210 including a variety of values and/or images. For example, as discussed above, depending on training or an application of the image processing model 104, the output 210 may include a classification of an image, a value associated with the image, information about the image, a transformed image, or any other output associated with the input video 204 captured and generated by the video capturing device 110. The output 210 may be provided to the computing device 106 for storage, display, or for further processing.

Figure 2B:
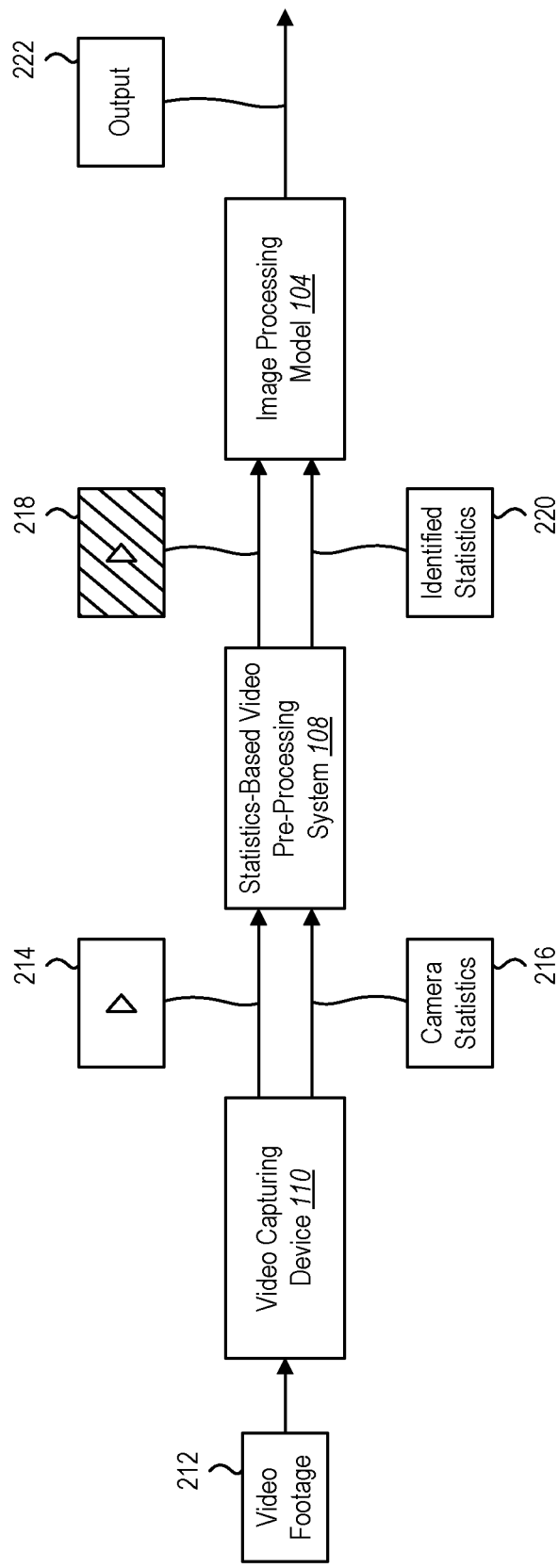
FIG. 2B illustrates an example process for identifying and providing image frames and camera statistics to an image processing model in accordance with one or more implementations.

FIG. 2B illustrates another example framework in accordance with one or more embodiments described herein that includes identifying and providing image frames and associated statistics as inputs to an image processing model 104. In particular, similarly to FIG. 2A, the video capturing device 110 can capture video footage 212. The video capturing device 110 can similarly generate an input video 214

(e.g., input video content) including a plurality of image frames and camera statistics 216 associated with the input video 214. The video capturing device 110 can provide both the input video 214 and associated camera statistics 216 to the pre-processing system 108 as discussed above in connection with FIG. 2A.

The pre-processing system 108 can utilize the camera statistics 216 to generate transformed video content 218. For example, the pre-processing system 108 can modify content from the input video 214 by further refining image frames, modifying color or brightness, down-sampling a resolution of the image frames, or otherwise modifying the input video 214. In one or more embodiments, the pre-processing system 108 transforms the input video 214 based on the camera statistics 216 received in conjunction with the input video 214. The pre-processing system 108 may also transform the input video 214 based on an application of the image processing model 104. For example, where the image processing model 104 implements a QR code reading algorithm, the pre-processing system 108 can transform the video content 204 by further enhancing, removing color, cropping irrelevant content, or otherwise modifying image frames that include a detected QR code image, particularly where that modification enables the image processing model 104 to more accurately or efficiently decode or decipher the QR code included within the image frame(s).

In addition to providing the transformed video content 218 to the image processing model 104, the pre-processing system 108 can provide one or more identified camera statistics 220 as inputs to the image processing model 104. For example, as discussed above, the pre-processing system 108 can identify camera statistics 220 including a subset of the camera statistics 216 provided by the video capturing device 110 in conjunction with the input video 214. In particular, the pre-processing system 108 can identify those camera statistics that are relevant to the selected or transformed image frames (e.g., of the transformed video content 218) and/or based on an application of the image processing model 104 itself.

By providing the identified statistics 220 in addition to the video content 218 (e.g., transformed images or video content) to the image processing model 104, the pre-processing system 108 can provide additional input information that enables the image processing model 104 to more efficiently or accurately generate a desired output 222. The image processing model 104 may select a specific algorithm best suited to process the transformed video content 218 based on the statistics 220 provided to the image processing model 104. In addition, the image processing model 104 may modify one or more algorithms applied to the transformed video content 218 to more efficiently or effectively analyze select video content 218 based on the identified statistics 220. In this way, even where the transformed video content 218 includes repetitive images or where the pre-processing system 108 has not selectively identified image frames as discussed above in connection with FIG. 2A, the image processing model 104 may nonetheless determine or identify the most relevant image frames to use in applying one or more algorithms of the image processing model 104 to the transformed video content 218.

While FIGS. 2A and 2B illustrate different inputs that are selected and provided to the image processing model 104, it will be understood that features and functionality discussed in connection with FIG. 2A may be applied in combination with features and functionality discussed in connection with FIG. 2B (and vice versa). For example, with respect to FIG. 2A, the pre-processing system 108 may provide identified camera statistics associated with the subset of image frames 208 to the image processing model 104 in addition to the selected subset of image frames 208. As another example with respect to FIG. 2B, the pre-processing system 108 may identify a subset of the transformed image frames 208 to provide to the image processing model 104 in addition to the identified camera statistics 220 to further enhance functionality of the image processing model 104 while preserving processing resources by image frames at a lower frame rate than the input video 214 provided from the video capturing device 110.

Figure 3:
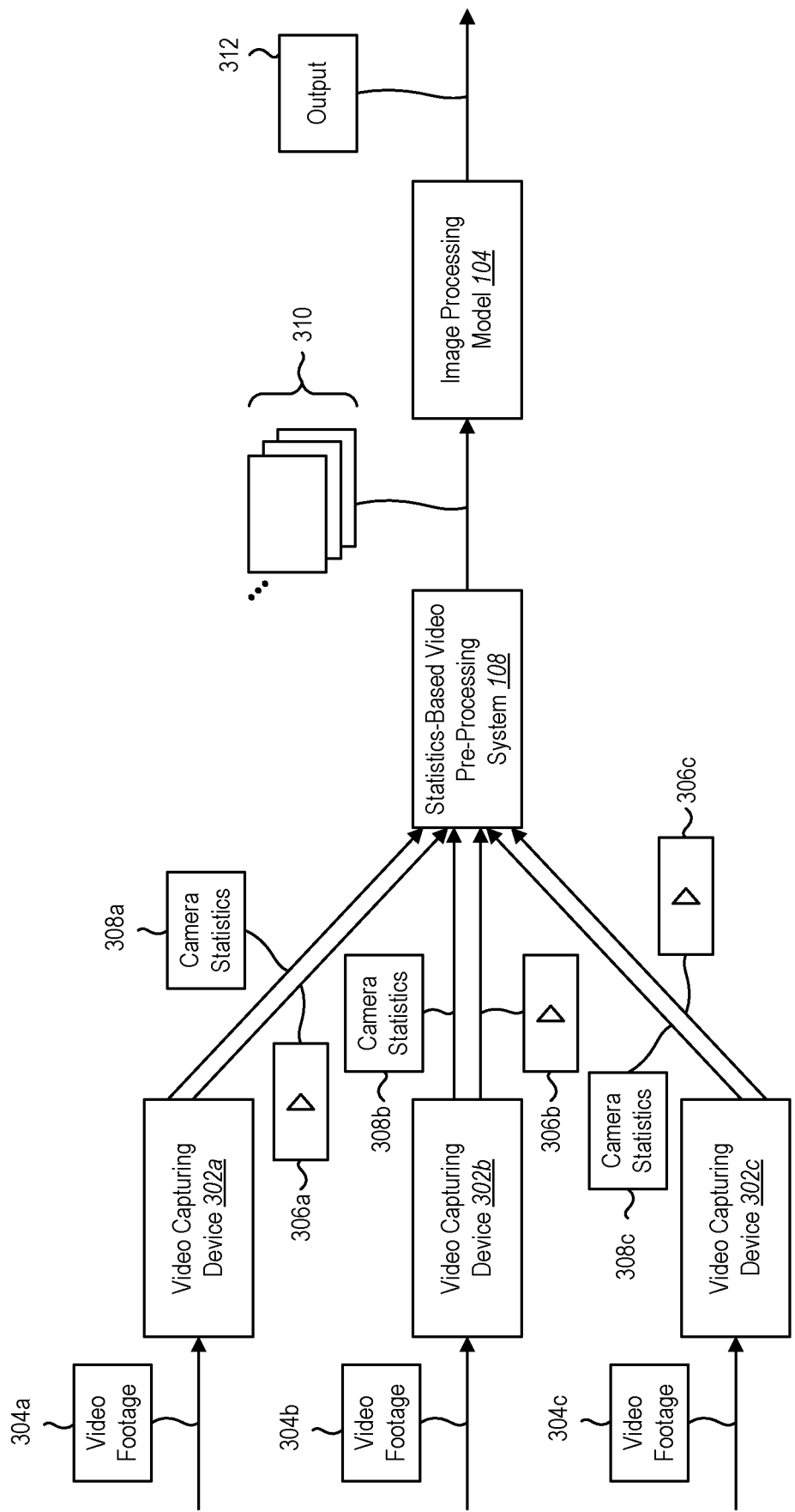
FIG. 3 illustrates an example process for selectively identifying and providing image frames from multiple video feeds in accordance with one or more implementations.

FIG. 3 illustrates another example implementation of the pre-processing system 108 for pre-processing video data and associated camera statistics from multiple video capturing devices. In particular, FIG. 3 illustrates an example framework in which a plurality of video capturing devices 302a-c capture video footage 304a-c using different hardware. In addition, the video capturing devices 302a-c can generate input videos 306a-c and associated camera statistics 308a-c used to generate the corresponding input videos 306a-c for the respective video capturing devices 302a-c. Capturing the video footage 304a-c and providing the input videos 306a-c and associated camera statistics 308a-c may include similar features as discussed above in connection with capturing video footage 202 and generating and providing input video 204 and associated camera statistics 206 illustrated in FIG. 2A.

The pre-processing system 108 may similarly pre-process the input videos 306a-c from the video capturing devices 302a-c based on the associated camera statistics 308a-c to identify a subset of image frames 310 to provide to the image processing model 104. For example, the pre-processing system 108 can selectively identify image frames from each of the input videos 306a-c to enable the image processing model 104 to effectively generate outputs 312 for the multiple videos 306a-c. As another example, where the input videos 306a-c refer to input video streams that are simultaneously provided from the video capturing devices 302a-c, the pre-processing system 108 can selectively identify image frames from a single input video from the plurality of input videos 306a-c determined (e.g., based on camera statistics for the single input video) to include content for producing a more useful output 222 than the other input video.

In one or more embodiments, the pre-processing system 108 provides no image frames of the input videos 306a-c until the camera statistics 308a-c indicate that the input videos 306a-c are likely to include content of interest that the image processing model 104 can use in generating an output 312. For example, where the camera statistics 308a-c indicate no movement or detected objects within the input videos 306a-c, the pre-processing system 108 may determine to send zero image frames from any of the input videos 306a-c until movement or other objects are detected within the input videos 306a-c.

As an illustrative example, where the video capturing devices 302a-c refer to a network of security video capturing devices 302a-c that simultaneously capture and provide input video streams to the pre-processing system 108, the pre-processing system 108 may use the camera statistics 308a-c provided by each of the video capturing devices 302a-c to identify which of the input videos 306a-c include content of interest (e.g., an identified individual, animal, or other object) based on an application of the image processing model 104. Where the pre-processing system 108 identifies that a first video 306a includes a detected individual or movement over a period of time, the pre-processing system 108 may select the subset of image frames 310 to provide to the image processing model 104 from the first video 306*a* during that period of time while discarding image frames from the second and third input videos 306*b-c* for the same period of time. The pre-processing system 108 can similarly switch between identifying subsets of image frames 310 from the different videos 306*a-c* based on changing camera statistics 308*a-c* over time and over different periods of time during which content of interest is detected within the respective input videos 306*a-c*.

As a further example, where the video capturing devices 302*a-c* selectively provide one input video at a time to the pre-processing system 108, the pre-processing system 108 may identify and provide image frames to the image processing model 104 in response to detected scene changes (e.g., a switch between input video streams). For instance, the pre-processing system 108 may detect a scene change based on a change in camera statistics for the different input videos (e.g., a change in white balance, a change in focal distance). The pre-processing system 108 may respond to the detected scene change by quickly providing several image frames to the image processing model 104 to classify the new scene, after which the pre-processing system 108 may wait until detecting a new scene before sending additional image frames to the image processing model 104.

As shown in FIG. 3, the image processing model 104 can generate an output 312 based on an application of the image processing model 104. For instance, in the example implementation including the multiple security cameras, the image processing model 104 may include a face counter, face identifier, or application for identifying a key image including a useful representation of an individual or other object detected therein. Indeed, similar to one or more implementations discussed herein, the image processing model 104 can generate various types of outputs depending on training of the image processing model 104 to accomplish a particular application.

Figure 4:
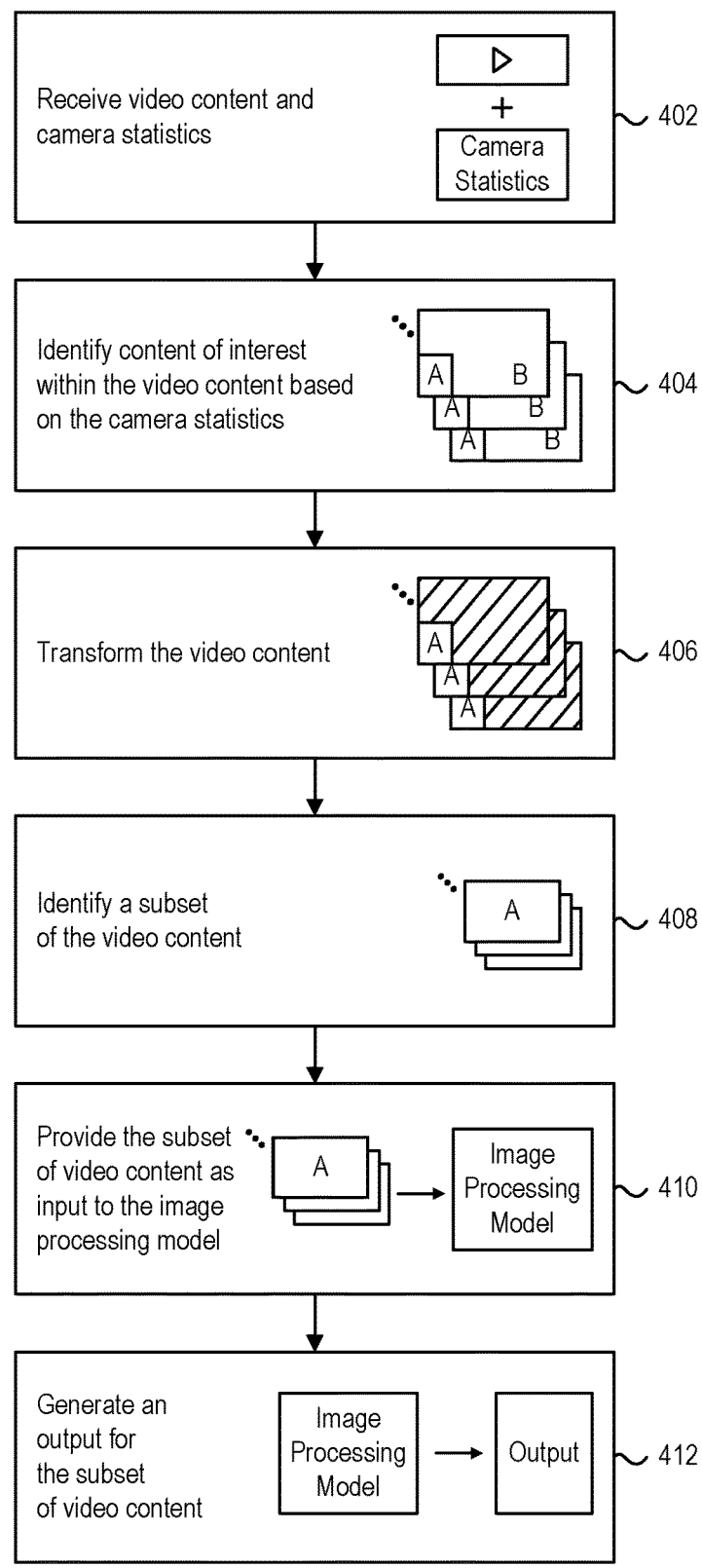
FIG. 4 illustrates an example workflow for transforming video content and providing a subset of image frames to an image processing model in accordance with one or more implementations.

FIG. 4 illustrates an example process for identifying image frames for providing as an input to an image processing model 104 and generating an output based on an application of the image processing model 104. For example, as shown in FIG. 4, the pre-processing system 108 can perform an act 402 of receiving video content (e.g., an input video) and associated camera statistics from a video capturing device (e.g., the video capturing device 110). The video content may include one or more digital video files including input videos and associated camera statistics. In one or more embodiments, the video content includes one or more incoming streams of video content and associated camera statistics provided in real-time from the video capturing device(s).

In one or more embodiments, the pre-processing system 108 performs an act 404 of identifying content of interest within the video content based on the camera statistics. For example, the pre-processing system 108 may identify a set of image frames from the input video content that have been identified as higher quality (e.g., in focus, good lighting conditions) by the camera statistics. As another example, the pre-processing system 108 can identify image frames including one or more detected objects shown therein.

While identifying content of interest may include selectively identifying image frames that include content of interest, identifying content of interest may include identifying portions of image frames from the input video content that have the content of interest. As shown in FIG. 4, the pre-processing system 108 may identify regions (e.g., regions A and B) within individual image frames corresponding to more or less relevant content. In one or more implementations, the pre-processing system 108 identifies the content of interest based on an application of the image processing model 104. As an illustrative example, the pre-processing system 108 may identify regions of image frames that include detected faces or other interesting content associated with an application or desired output of the image processing model 104. As another example, the pre-processing system 108 can identify a foreground and background portion of image frames and determine that the foreground portions correspond to content of interest within the images.

As further shown in FIG. 4, the pre-processing system 108 can perform an act 406 of transforming the video content. For example, as discussed in one or more embodiments above, transforming the video content may include enhancing pixels, removing color, adjusting brightness between two input video streams, or otherwise modifying image frames based on camera statistics and/or an application of the image processing model 104. In one or more embodiments, the pre-processing system 108 transforms the video content by performing a cropping operation on the image frames by removing portions of the image frames that do not include content of interest.

For example, as shown in FIG. 4, the pre-processing system 108 can transform an image frame by removing a region that does not include content of interest to generate a cropped image including only the portion of the image frame including the content of interest. The pre-processing system 108 can similarly transform multiple image frames to generate a set of transformed image frames including cropped portions associated with regions of interest within the image frames from the input video content.

The pre-processing system 108 can additionally perform an act 408 of identifying a subset of the video content. For instance, the pre-processing system 108 can identify a subset of image frames from a plurality of image frames representative of the input video content. As shown in FIG. 4, the pre-processing system 108 can identify subsets of image frames including the identified portions of image frames corresponding to the content of interest. For example, where multiple image frames have been transformed to include only a cropped portion of the input image frames, the pre-processing system 108 can identify a subset of cropped image frames that have been identified as including content of interest.

While FIG. 4 illustrates an example in which the pre-processing system 108 first identifies content of interest and transforms the image frames prior to selecting a subset of image frames for providing to an image processing model 104, in one or more embodiments, the pre-processing system 108 first identifies a subset of image frames and subsequently transforms the subset of image frames based on camera statistics and an application of the image processing model 104. For example, in one or more implementations, the pre-processing system 108 first identifies a subset of image frames, analyzes content of the subset of image frames to identify regions of interest, and crops the subset of image frames (or otherwise modifies the image frames) based on the identified regions of interest.

As further shown in FIG. 4, the pre-processing system 108 can perform an act 410 of providing the subset of video content as input to the image processing model 104. In one or more embodiments, the pre-processing system 108 provides camera statistics to the image processing model 104 in conjunction with the subset of video content. For example, the pre-processing system 108 can identify camera statistics relevant to an identified subset of image frames and an application of the image processing model 104.

As further shown, the pre-processing system 108 can perform an act 412 of generating an output for the subset of video content. The pre-processing system 108 can generate an output based on an application of the image processing model 104. As discussed above, the output may include a variety of outputs (e.g., an output image, an image or video classification, a decoded value) based on a variety of potential applications of the image processing model 104. In addition, in one or more embodiments, the output may be based on a combination of the subset of video content and select camera statistics provided as inputs to the image processing model 104.

Figure 5:
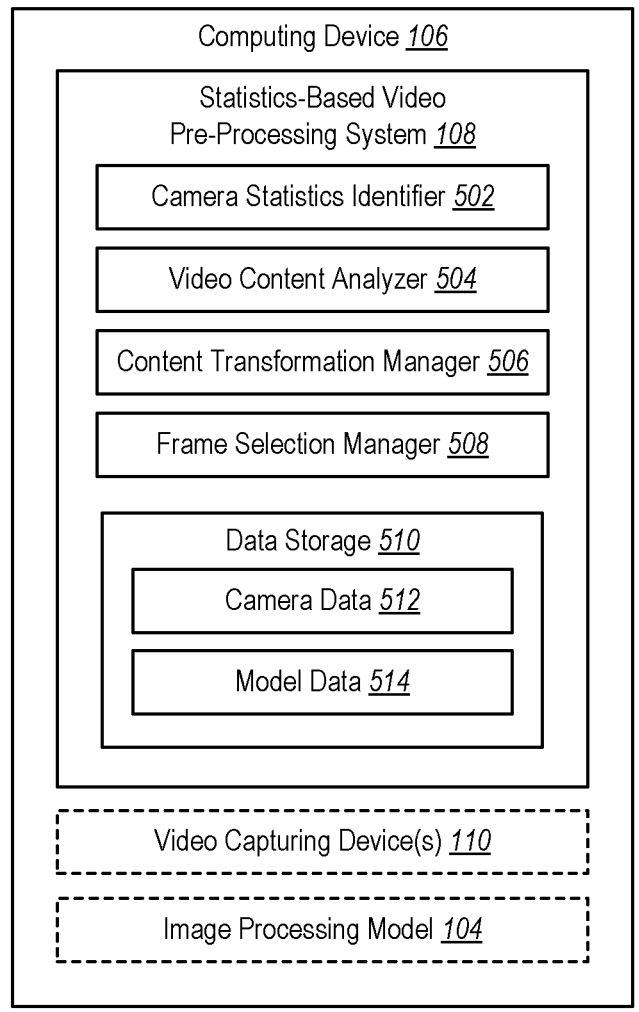
FIG. 5 illustrates a schematic diagram of an example computing device including a statistics-based video pre-processing system in accordance with one or more implementations.

Turning now to FIG. 5, additional detail will be provided regarding components and capabilities of an example architecture for the pre-processing system 108. As shown in FIG. 5 and as discussed above in connection FIG. 1, the pre-processing system 108 can be implemented by a computing device 106, which may refer to a variety of devices such as a mobile device (e.g., a smartphone, a laptop), a non-mobile consumer electronic device (e.g., a desktop computer), an edge computing device, server device, or other computing devices. In accordance with one or more implementations described above, the pre-processing system 108 can selectively provide image frames to an image processing model 104 based on camera statistics received in conjunction with input video generated by a video capturing device. In addition, in one or more embodiments, the pre-processing system 108 identifies and provides camera statistics to the image processing model 104 for use in generating an output based on the selected image frames.

As shown in FIG. 5, the pre-processing system 108 includes a camera statistics identifier 502, a video content analyzer 504, a content transformation manager 506, a frame selection manager 508, and a data storage 510. The data storage 510 can store camera data 512 and model data 514.

As further shown in FIG. 5, in addition to the pre-processing system 108, the computing device 106 may include the image processing model 104 thereon. In particular, as an alternative to the image processing model 104 implemented on one or more server device(s) 102 (e.g., on a cloud computing system), the image processing model 104 is implemented on the computing device 106 to cooperatively generate an output based on image frames identified and provided by the pre-processing system 108.

In addition, in one or more embodiments, the computing device 106 includes a video capturing device 110 implemented thereon. For example, where the computing device 106 refers to a mobile device, the video capturing device 110 may refer to a front camera, back camera, or combination of multiple cameras implemented thereon. As another example, where the computing device 106 includes a desktop computer, the video capturing device 110 may refer to an auxiliary device plugged into the desktop computer and operating in conjunction with a camera application operating on the computing device 106.

As shown in FIG. 5, the pre-processing system 108 includes a camera statistics identifier 502. The camera statistics identifier 502 can receive camera statistics received from a video capturing device 110 that are provided in conjunction with an input video generated by the video capturing device 110. In addition, the camera statistics identifier 502 can selectively identify some or all of the camera statistics based on an application of the image processing model 104. For example, the camera statistics identifier 502 can identify a set of relevant statistics to use in pre-processing the input video. In addition, the camera statistics identifier 502 can identify a set of relevant statistics to provide to the image processing model 104 based on a corresponding application of the image processing model 104.

The pre-processing system 108 may additionally include a video content analyzer 504. For example, the video content analyzer 504 can analyze image frames of an input video to identify content of interest portrayed within image frames of the input video. The video content analyzer 504 can analyze image frames of the input video based on the camera statistics received in conjunction with the input video. For instance, where the camera statistics indicate select image frames having one or more detected objects or movement portrayed therein, the video content analyzer 504 can analyze those image frames to identify regions or portions of the image frames having the detected objects or movement.

The pre-processing system 108 may additionally include a content transformation manager 506. The content transformation manager 506 can perform a number of operations of the input video prior to providing any number of image frames to the image processing model 104. For example, the content transformation manager 506 can perform operations such as cropping image frames, smoothing image frames, combining multiple images (e.g., from subsequently captured image frames or received from different video capturing devices), correcting brightness or focus issues of different image frames, enhancing different portions of the image frames, or otherwise modifying the input video in a number of ways. The content transformation manager 506 can modify the images based on camera statistics and/or based on an application of the image processing model 104.

As further shown, the pre-processing system 108 includes a frame selection manager 508. The frame selection manager 508 can identify select portions of the video content to provide to the image processing model 104. For example, the frame selection manager 508 can select a subset of frames from a plurality of frames representative of an input video received from the video capturing device. As another example, the frame selection manager 508 can select portions of frames (e.g., cropped portions) including identified content of interest to provide to the image processing model 104. Moreover, the frame selection manager 508 may selectively identify transformed image frames to provide to the image processing model 104.

The pre-processing system 108 can additionally include a data storage 510. The data storage 510 may include camera data 512. The camera data 512 may include any information about one or multiple video capturing devices in communication with the pre-processing system 108. For example, the camera data 512 may include device-related camera statistics including information about camera specifications, image resolutions, display ratios, brightness settings, frame rates, and other camera statistics stored on data storage 510 with respect to one or more video capturing devices. The camera data 512 may additionally include information about orientation of one or multiple cameras to enable the pre-processing system 108 to merge images from multiple cameras or more accurately analyze video content captured by multiple video capturing devices.

The data storage 510 may additionally include model data 514. The model data 514 may include any information about one or multiple image processing models and/or applications performed by the image processing models. For example, the model data 514 may include an identification of one or more relevant statistics corresponding to a particular application or image processing model. The model data may additionally include types of content (e.g., QR codes, faces)

that the pre-processing system 108 may consider when determining which image frames to provide to one or more image processing models.

Each of the components of the computing device 106 may be in communication with one another using any suitable communication technologies. In addition, while the components of the computing device 106 are shown to be separate in FIG. 5, any of the components or subcomponents may be combined into fewer components, such as into a single component, or divided into more components as may serve a particular implementation.

The components of the computing device 106 may include software, hardware, or both. For example, the components of the computing device 106 shown in FIG. 5 may include one or more instructions stored on a computer-readable storage medium and executable by processors of one or more computing devices. When executed by the one or more processors, the computer-executable instructions of the computing device 106 can perform one or more methods described herein. Alternatively, the components of the pre-processing system 108 can comprise hardware, such as a special purpose processing device to perform a certain function or group of functions. Additionally, or alternatively, the components of the computing device 106 may include a combination of computer-executable instructions and hardware.

Figure 6:
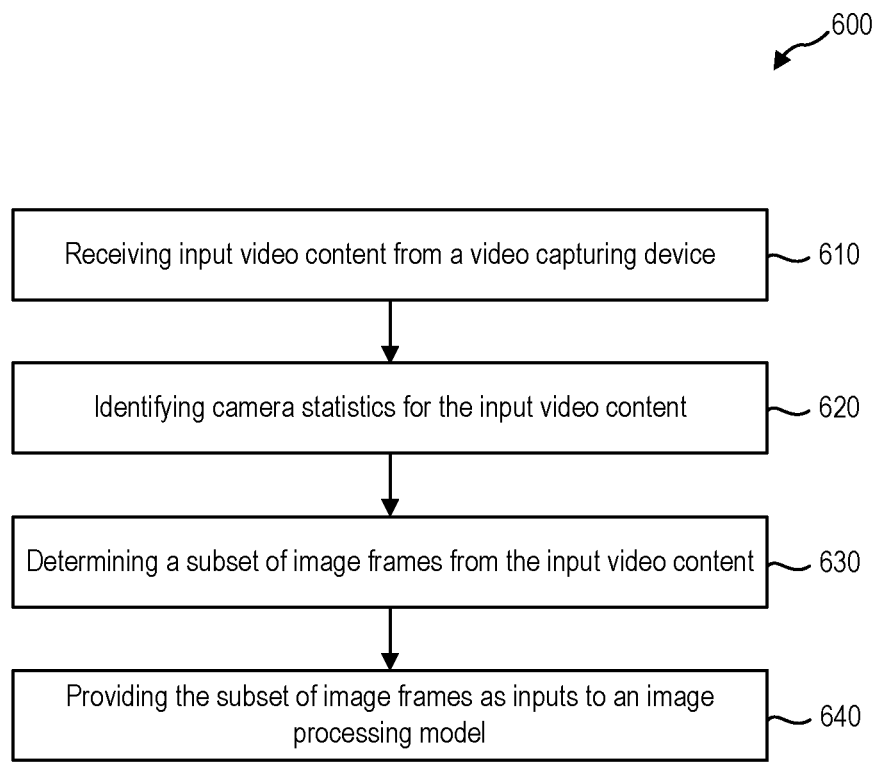
FIG. 6 illustrates an example method of selectively providing image frames to an image processing model in accordance with one or more implementations.
Figure 7:
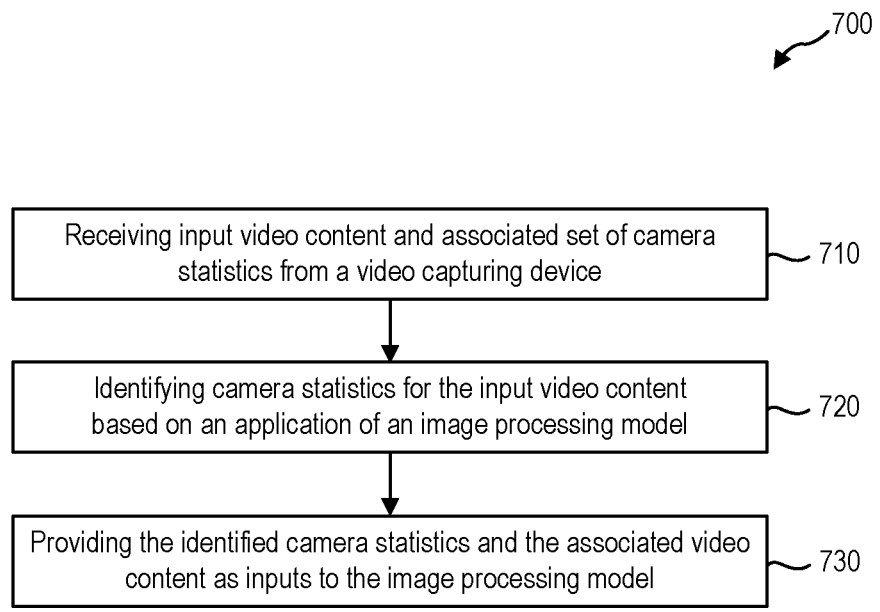
FIG. 7 illustrates another example method of identifying and providing image frames and camera statistics to an image processing model in accordance with one or more implementations.

Turning now to FIGS. 6-7, these figures illustrate example flowcharts including series of acts for selectively identifying image frames and/or camera statistics to provide to an image processing model. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

As shown in FIG. 6, a series of acts 600 may include an act 610 of receiving input video content from a video capturing device. In one or more embodiments, the act 610 includes receiving, from one or more video capturing devices, input video content including a plurality of image frames. The input video content may include captured video footage that has been locally refined by the one or more video capturing devices based on the camera statistics.

As further shown in FIG. 6, the series of acts 600 may include an act 620 of identifying camera statistics for the input video content. In one or more embodiments, the act 620 includes identifying camera statistics for the video content where the camera statistics include data obtained by the one or more video capturing devices in conjunction with generating the video content. Identifying camera statistics may include receiving a set of camera statistics from the one or more video capturing devices and identifying one or more camera statistics based on an application of the image processing model.

As further shown, the series of acts 600 may include an act 630 of determining a subset of image frames from the input video content. In one or more embodiments, the act 630 includes determining a subset of image frames from the plurality of image frames based on the camera statistics. In one or more embodiments, determining the subset of image frames includes selecting image frames from the plurality of image frames based on a rate at which the image processing model is configured to generate outputs based on input images.

In one or more embodiments, determining the subset of image frames includes identifying image frames that include content of interest based on the camera statistics. Identifying the image frames may include identifying a first set of image frames to provide as inputs to the image processing model at a first frame rate where the first set of image frames correspond to a first duration of the video content that includes content of interest. In addition, identifying the image frames may include identifying a second set of image frames to provide as inputs to the image processing model at a second frame rate where the second set of image frames correspond to a second duration of the video content that does not include content of interest. The second frame rate may be higher than the first frame rate based on the first set of image frames including content of interest and the second set of image frames not including content of interest.

In addition, the series of acts 600 may include an act 640 of providing the subset of image frames as inputs to an image processing model. In one or more embodiments, the act 640 includes providing the subset of image frames as inputs to an image processing model trained to generate an output based on one or more input images. In one or more embodiments, the image processing model refers to a deep learning model. The deep learning model (or other type of image processing model) may be implemented on a cloud computing system. In addition or as an alternative, the deep learning model (or other type of image processing model) may be implemented on a computing device that receives the input video content from the video capturing device.

In one or more implementations, receiving the input video content includes receiving a plurality of input video streams from a plurality of video capturing devices where the plurality of input video streams includes image frames from the plurality of input video streams. In addition, the camera statistics may include data obtained by the plurality of video capturing devices in conjunction with generating the plurality of input video streams. Further, determining the subset of image frames may include selectively identifying the subset of image frames from a first input video stream of the plurality of input video streams based on identified content of interest being detected within video content from the first input video stream. In addition, determining the subset of image frames may include selectively identifying image frames from the first input video stream based on camera statistics obtained by a video capturing device that generated the first input video stream.

As shown in FIG. 7, another series of acts 700 may include an act 710 of receiving input video content and associated set of camera statistics from a video capturing device. In one or more embodiments, the act 710 includes receiving, from one or more video capturing devices, input video content and a set of camera statistics where the set of camera statistics includes data obtained by the one or more video capturing devices in conjunction with generating the video content. In one or more embodiments, the input video content includes captured video footage that has been locally refined by the one or more video capturing devices based on the camera statistics.

As further shown in FIG. 7, the series of acts 700 may include an act 720 of identifying camera statistics for the input video content based on an application of an image processing model. In one or more embodiments, the act 720 includes identifying a subset of camera statistics from the set of camera statistics associated with a subset of the video content based on an application of an image processing model.

As further shown, the series of acts 700 may include an act 730 of providing the identified camera statistics and the associated video content as inputs to the image processing model. In one or more embodiments, the act 730 includes providing the identified subset of camera statistics and the associated subset of video content as inputs to a deep learning model (or other image processing model) trained to generate an output based on video content and camera statistics. Providing the identified subset of camera statistics and the associated subset of video content as inputs to the deep learning model may include providing cropped portions of the video content to the deep learning model.

In one or more embodiments, the series of acts 700 includes transforming the input video content based on the identified subset of camera statistics. In addition, providing the identified subset of camera statistics and the associated subset of video content to the deep learning model may include providing transformed video content to the deep learning model.

The deep learning model may be trained based on training data including both video content and associated camera statistics. In addition, the deep learning model may be implemented on one or more of a cloud computing system or a computing device that receives the input video content from the one or more video capturing devices. In addition, in one or more embodiments, the one or more video capturing devices and the deep learning model are implemented on a computing device and coupled to one or more processors of a system.

Figure 8:
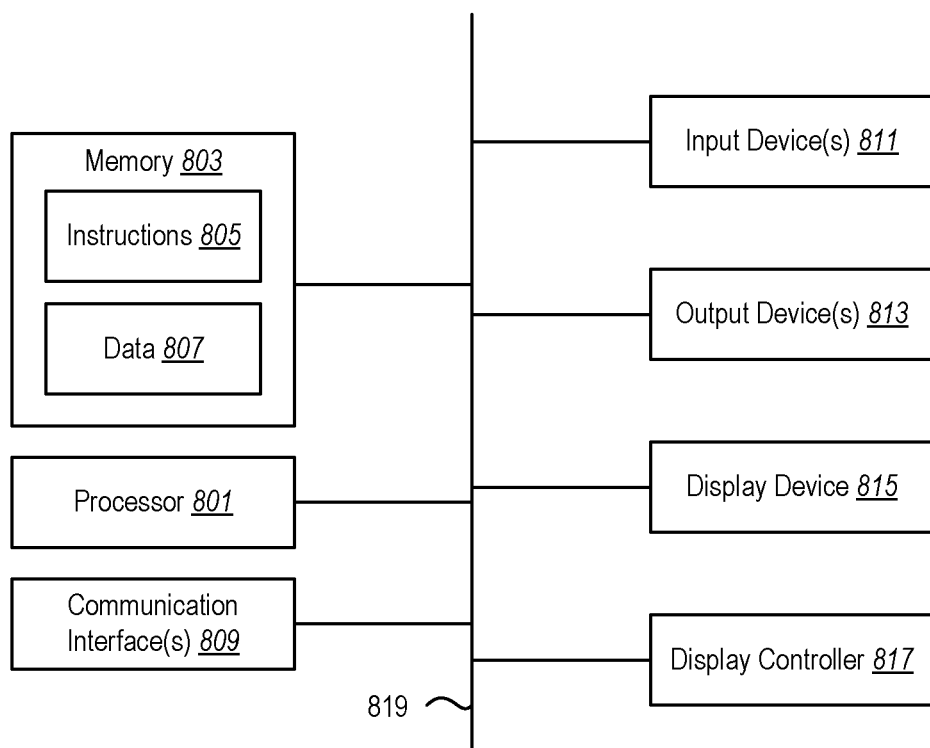
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving, from one or more video capturing devices, input video content including a plurality of image frames;
   identifying camera statistics for the video content, the camera statistics including data obtained by the one or more video capturing devices in conjunction with generating the video content;
   providing a first subset of image frames of the plurality of image frames at a first frame rate as inputs to an image processing model that is trained to generate an output based on one or more input images;
   detecting content of interest in a second subset of image frames of the plurality of image frames based on the camera statistics; and
   based on detecting the content of interest in the second subset of image frames of the plurality of image frames, providing the second subset of image frames as inputs to the image processing model at a second frame rate higher than the first frame rate.

2. The method of claim 1, wherein the input video content comprises captured video footage that has been locally refined by the one or more video capturing devices based on the camera statistics.

3. The method of claim 1, wherein identifying the camera statistics comprises:
   receiving a set of camera statistics from the one or more video capturing devices; and
   identifying one or more camera statistics based on an application of the image processing model.

4. The method of claim 1, further comprising selecting image frames from the plurality of image frames at the higher frame rate based on a rate at which the image processing model is configured to generate outputs based on input images.

5. The method of claim 1, wherein detecting content of interest in the second subset of image frames comprises identifying the second subset of image frames that include content of interest based on the camera statistics.

6. The method of claim 5,
   wherein the first set of image frames corresponds to a first duration of the video content that does not include content of interest, and
   wherein the second set of image frames corresponds to a second duration of the video content that does include content of interest.

7. The method of claim 1,
   wherein receiving the input video content comprises receiving a plurality of input video streams from a plurality of video capturing devices, the plurality of input video streams comprising image frames from the plurality of input video streams; and
   wherein the camera statistics include data obtained by the plurality of video capturing devices in conjunction with generating the plurality of input video streams.

8. The method of claim 7, further comprising:
   identifying the first subset of image frames from a first input video stream of the plurality of input video streams and determining the first frame rate based on a determination that no content of interest is present within video content from the first input video stream; and
   identifying the second subset of image frames from a second input video stream of the plurality of input video streams and determining the first frame rate based on a determination that content of interest is present within video content from the second input video stream.

9. The method of claim 8, wherein identifying the second subset of image frames further comprises selectively identifying image frames from the second input video stream based on camera statistics obtained by a video capturing device that generated the second input video stream.

10. The method of claim 1, wherein the image processing model comprises a deep learning model, and wherein providing the first subset of image frames and providing the second subset of image frames comprises providing the first subset of image frames and providing the second set of image frames to the deep learning model implemented on a cloud computing system.

11. The method of claim 1, wherein the image processing model comprises a deep learning model, and wherein providing the first subset of image frames and providing the second subset of image frames comprises providing the first subset of image frames and providing the second subset of image frames as inputs to the deep learning model implemented on a computing device that receives the input video content from the video capturing device.

12. The method of claim 1, wherein providing the second subset of image frames as inputs to the image processing model at a second frame rate that is higher than the first frame rate is based on a capability of a computing device to apply the image processing model at a particular framerate.

13. The method of claim 1, further comprising modifying the second subset of image frames based on the content of interest prior to providing the second subset of image frames as inputs to the image processing model.

14. The method of claim 13, wherein modifying the second subset of image frames comprises: removing content from the second subset of image frames based on the content of interest.

15. The method of claim 13, wherein modifying the second subset of image frames includes one or more of: refining, modifying color, modifying brightness, down-sampling resolution, enhancing, removing color, enhancing pixels, or cropping irrelevant content of one or more image frames of the second subset of image frames.

16. A system, comprising:
    one or more processors;
    memory in electronic communication with the one or more processors; and
    instructions stored in the memory, the instructions being executable by the one or more processors to cause a computing device to:
    receive, from a video capturing device, input video content including a plurality of image frames;

identify camera statistics for the video content, the camera statistics including data obtained by the video capturing device in conjunction with capturing the video content;

provide a first subset of image frames of the plurality of image frames at a first frame rate as inputs to a deep learning model, wherein the deep learning model is trained to generate an output based on one or more input images;

detect content of interest in a second subset of image frames from the plurality of image frames based on the camera statistics; and based on the detected content of interest in the second subset of image frames from the plurality of image frames, provide the second subset of image frames as inputs to a deep learning model at a second frame rate higher than the first frame rate.

17. The system of claim 16, wherein the one or more video capturing devices and the deep learning model trained to generate the output based on the one or more input images are both implemented on the computing device and coupled to the one or more processors of the system.

18. The system of claim 16, wherein providing the second subset of image frames as inputs to the deep learning model at a second frame rate higher than the first frame rate comprises: providing the second subset of image frames at a higher frame rate than the first framerate based on a capability of a computing device to apply the deep learning model at a particular framerate.

19. The system of claim 16, further comprising modifying the second subset of image frames based on the content of interest prior to providing the second subset of image frames as inputs to the deep learning model.

20. The method of claim 1, wherein the content of interest is at least one of an identified individual, an animal, a face, an object, or motion data detected in connection with the image frames from the second subset of image frames.

* * * * *